Patented Mar. 3, 1925.

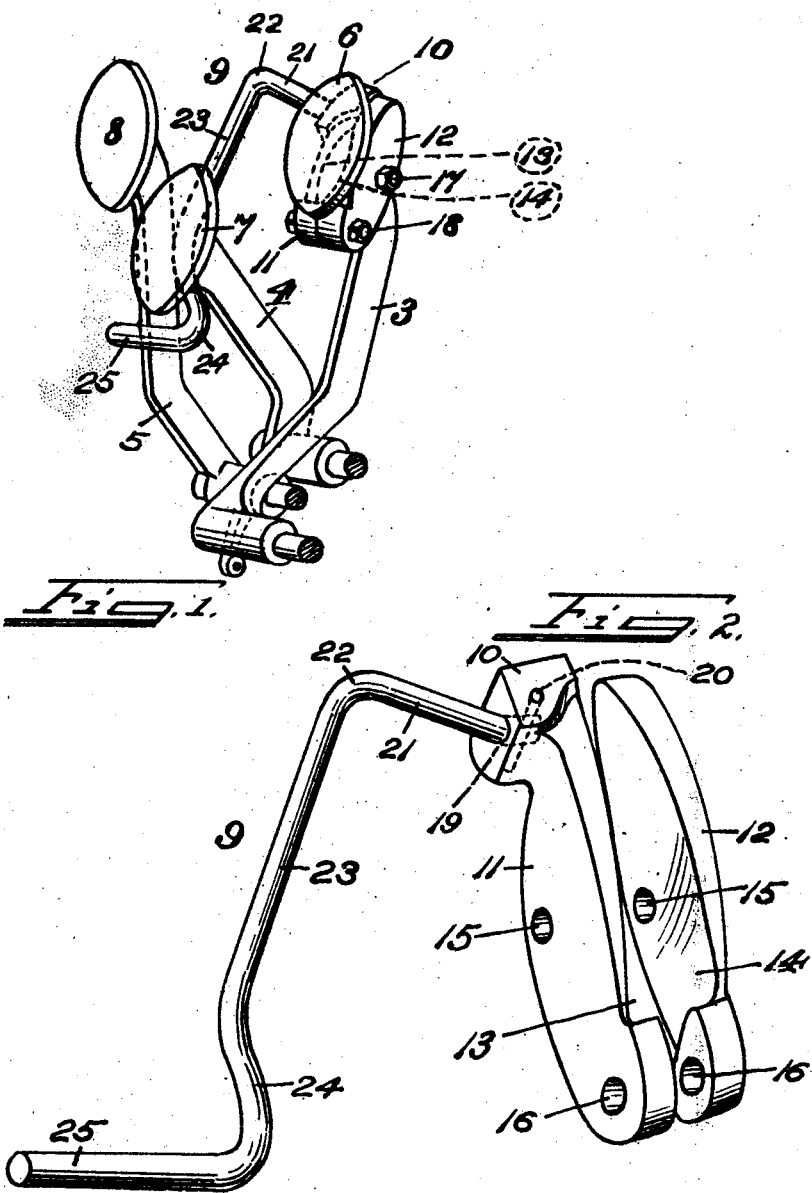

1,528,668

UNITED STATES PATENT OFFICE.

GEORGE KUNKEL, OF NORTH COLLEGE HILL, AND GEORGE T. ZINK, OF CINCINNATI, OHIO, ASSIGNORS TO THEMSELVES AND FREDERICK H. BECKER, OF NORTH COLLEGE HILL, OHIO.

NEUTRALIZER COUPLER FOR AUTOMOBILE FOOT BRAKES.

Application filed September 8, 1924. Serial No. 736,431.

*To all whom it may concern:*

Be it known that we, GEORGE KUNKEL and GEORGE T. ZINK, both citizens of the United States of America, and residents, respectively, of North College Hill, in the county of Hamilton and State of Ohio, and Cincinnati, said county and State, have jointly invented a certain new and useful Improvement in Neutralizer Couplers for Automobile Foot Brakes, of which the following is a specification.

This invention relates to angulated arms that are attached to the brake-pedals of automobile driving devices and extend laterally in relation to the reverse and clutch pedals of the said automobile driving devices so that in an emergency the depressing of the said brake-pedals simultaneously depress the said clutch-pedal and thus remove the power and apply the brake synchronously, as well as instantly, and thereby serve as effective safety means in the operation of said vehicles, and more especially when driven by persons of limited skill or experience in such service.

The details of structure of our invention will be readily and fully understood by reference to the accompanying sheet of drawings, in which—

Figure 1 is a fragmentary perspective view showing a set of the three pedals common to a "Ford" type of automobile, the several shafts of said pedals being shown in cross-section and our angulated-arm and its mounting-clamp improvement herein in position for use on the brake-pedal and extended across in due relation to the reverse and clutch pedals of the said set of pedals; and—

Figure 2 is a perspective view of our device taken by itself, but with the two-part clamp-portion thereof separated ready for application to the upper part of the brake-pedal, just beneath the foot-plate of the latter.

3 indicates the brake-pedal; 4, the reverse-pedal; and 5, the clutch-pedal, all suitably mounted on shafts and each having foot-plates, 6, 7 and 8, respectively. These pedals are those common to the "Ford" type of automobile driving device, but they may be otherwise those of any similar type of foot drive-controls.

9 indicates an angulated or somewhat irregular-crank shape arm extending from the upper outer end 10 of a clamp-member 11 of a two-part clamp device that has a corresponding clamp-member 12, except that the latter member 12 lacks the said outer end 10 of said companion member 11. The two clamp-members 11 and 12 are recessed or sloped at 13 and 14, respectively, on their inner adjacent faces so as to readily and snugly fit in place on the upper end of the brake-pedal 4 beneath the foot-plate 6 thereof, aligned pairs of holes 15 and 16 being provided in said clamp-members 11 and 12 for the reception of transverse bolts 17 and 18, respectively, to firmly and detachably secure the clamp in place on the brake-pedal. The said outer end of the clamp-member 11 is in the nature of a head or enlargement that seats the inner end of the said angulated-arm 9 in a socket 19, and a cross-pin 20 is used in the said head 10 to secure said inner end of the angulated-arm against accidental removal from seated place.

The angulated-arm can, of course, be otherwise secured in extended position at the outer end of the clamp-member 11 by any well-known means.

The said angulated-arm 9 is of irregular-crank form or shape, as above stated, its inner end 21 projecting at an obtuse angle from the outer face of the clamp-member 11; then a short rounded or curved bend 22 made in the rod that forms the arm; then a long straight portion 23 made in said rod at a right-angle to said part 21; then a slightly simulated S-shape portion 24 made in the rod, with a direct straight outer end 25 made in the rod that is practically horizontal and at right-angles to the flat-sides of the clutch-pedal 5. The prime objects of these bends or formations in the rod that comprises the said angulated-arm 9 are to provide ample clearance of each of said respective portions of the rod in connection with the reverse-pedal and the desired contact with the clutch or neutral pedal, which are essential to the efficiency of our device or auxiliary neutralizing controller herein in immediately shutting off the power and applying the brake simultaneously by the action of but one foot only of the operator of the vehicle in driving it, and more especially in crowded places or where danger of collision or other accident is greatest, and where it is necessary and expedient to stop the vehicle in quick order and without sudden, jerking shock.

It is best that the outer end 25 of the angulated-arm 9 be in just touching contact with the inner edge of the clutch or neutral pedal for immediate forward action, and without any lost motion in such action, in conjunction with the brake-pedal 4 from whence the device is operated, the other pedals being entirely free from the said action of the device until it is necessary to enlist it in an emergency where the accident is to be avoided by a quick and effective stopping of the vehicle by the use of but the right foot of the operator in connection with the driving mechanism of such vehicle. The device herein is ready for immediate emergency use in coupling the brake and neutral in operative power-and-braking synchronous stoppage use or control.

In operation, the right foot simply presses upon the brake-pedal foot-plate and simultaneously the auxiliary, angulated crank-arm automatically reaches to and depresses the neutral-pedal to at once throw the engine-clutch into "neutral" without otherwise touching the neutral and brake pedal parts separately with both feet. The device may be otherwise worked to reverse or back the vehicle by depressing "reverse" and "brake" at one time, the right foot easily spanning across both foot-plates of said "reverse" and "brake". Both feet are not required in the operation of the coupler device herein. The device is easily applied to and removed from place and without any change being necessary or made whatever in the driving or controlling devices of the vehicle.

We claim:—

An auxiliary coupler and neutralizing device for the transmission control of automobile driving-mechanism, the same comprising a pair of separable clamp-members and an angulated irregular-crank shape arm extending from the upper or outer end of the brake-pedal of an automobile beneath the outer edge of the reverse-pedal thereof and thence in approximate contact with the inner edge of the clutch or neutral pedal of said automobile, substantially as shown and described.

GEORGE KUNKEL.
GEORGE T. ZINK.